UNITED STATES PATENT OFFICE.

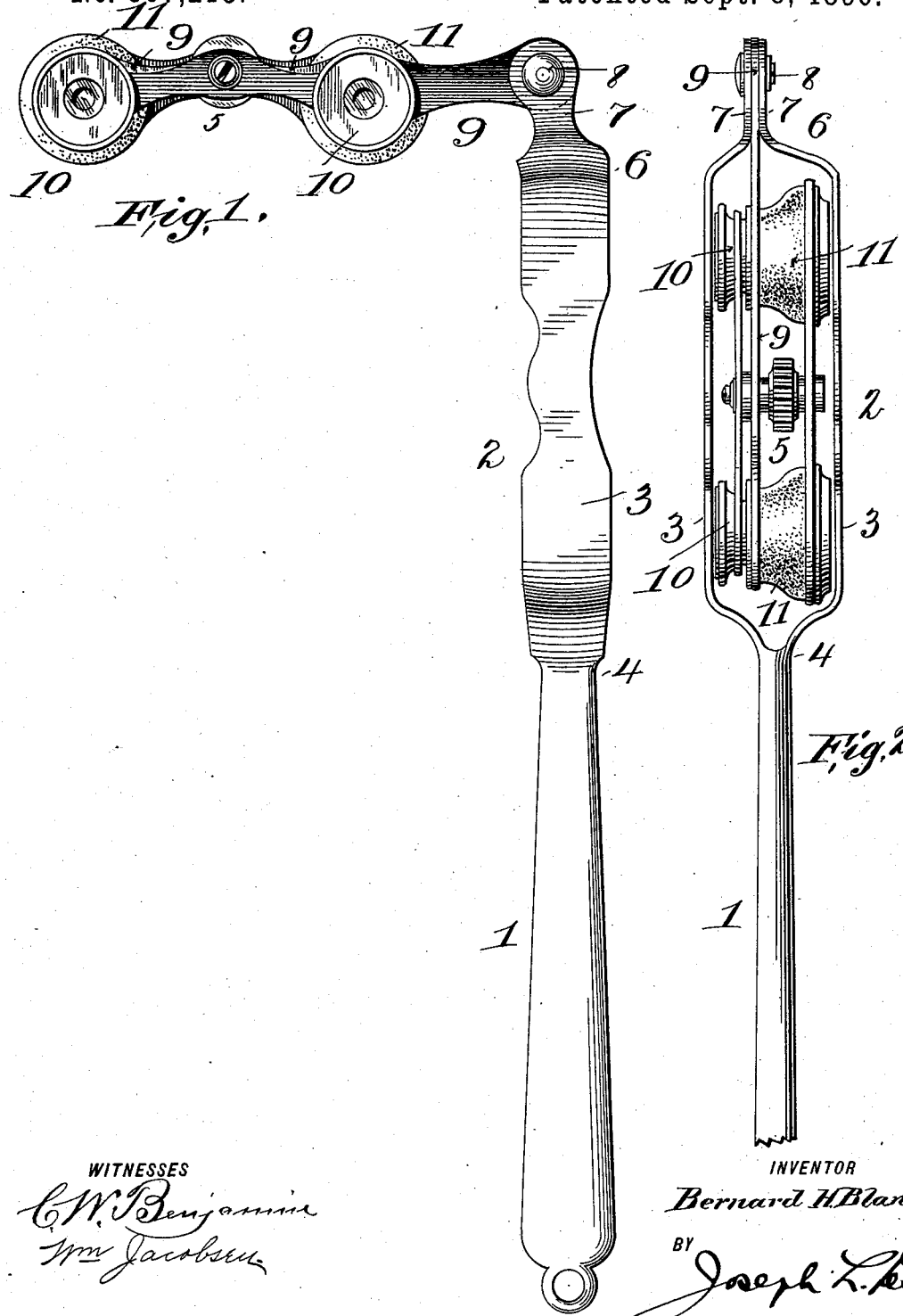

BERNARD H. BLANK, OF NEW YORK, N. Y., ASSIGNOR TO HAMMEL, RIGLANDER & CO., OF SAME PLACE.

OPERA-GLASS HOLDER.

SPECIFICATION forming part of Letters Patent No. 567,215, dated September 8, 1896.

Application filed June 1, 1896. Serial No. 593,721. (No model.)

*To all whom it may concern:*

Be it known that I, BERNARD H. BLANK, a citizen of the United States, residing at the city, county, and State of New York, have invented a new and useful Improvement in Opera-Glass Holders, of which the following is a specification.

My invention relates to a device for carrying an opera-glass and providing it with a supporting-handle, the handle being adapted to bodily receive and protect the glass.

My invention further resides in the combination, with a suitable handle and a receptacle, of an opera-glass pivotally secured to said handle at one side of the longitudinal axis of the receptacle, so as to allow of the glasses being swung into said receptacle and the bulkiest portion of the glasses to lie at one side of the longitudinal axis of the receptacle.

My invention further resides in the construction and combination of parts and further pointed out in the claims.

In the drawings forming part of this specification, Figure 1 is a side elevation of the holder, showing the opera-glass swung out from the receptacle formed in the holder; and Fig. 2, a front elevation thereof, showing the glass swung in place within the receptacle.

Similar numerals of reference indicate corresponding parts throughout both views.

The holder comprises the handle portion 1 and receiving portion 2, formed at one end of the handle, formed by side pieces 3, extending outwardly from the handle at 4 to form a recess or receptacle 5 between them, the side pieces coming together at the end of the recess, as at 6, to form extensions 7 thereon, the extensions being located at one side of the central longitudinal plane of either the handle or side pieces, preferably the latter. The extensions 6 are provided with apertures in their ends, through which passes a stud 8, and upon the stud is hinged the supporting-bar 9 of the opera-glasses, to which are secured in the usual way the eyepiece 10, the barrels and object-glasses 11 being on the other side. By locating the extensions 7 at one side of the longitudinal axis of either the side pieces or handle the difference in sizes of the parts of the glass is accommodated, and when the glass is swung into the receptacle the side pieces 3 protect the lenses. The extensions 7 are preferably extended so that their longitudinal axis is at an angle to the plane of the side pieces 3, and the bar 9 is given the desired conformation to enable it to lie within the extensions when the glass is in place. The side pieces can be conformed to the outline of the prominent parts of the glass, as shown.

Having described my invention, I claim—

1. In an article of the class described, the combination of a handle, a receptacle formed on one end thereof, and an opera-glass having a bar pivotally secured to one end of the receptacle at one side of the longitudinal center thereof, and adapted to be swung into and received by said receptacle, substantially as described.

2. The combination with the handle, a receptacle formed in the end thereof comprising the parallel side pieces 3 diverging from the handle, and the extensions 6 formed at the ends of the side pieces and located at one side of the longitudinal axis of the side pieces, a bar pivotally secured in the said extensions and lenses fixed to the said bar and adapted to be swung into said receptacle, substantially as described.

Signed at the city, county, and State of New York this 20th day of May, 1896.

BERNARD H. BLANK.

Witnesses:
JOSEPH L. LEVY,
WM. JACOBSEN.